2,924,593
POLYMERIZATION OF ETHYLENE USING AS A CATALYST THE PRODUCT FORMED BY MIXING A BIS(CYCLOPENTADIENYL) ZIRCONIUM SALT WITH AN ALKYL METALLIC COMPOUND

David S. Breslow, Wilmington, Del., assignor to Hercules Powder Company, Wilmington, Del., a corporation of Delaware No Drawing. Application August 23, 1956
Serial No. 605,703

14 Claims. (Cl. 260—94.9)

This invention relates to an improved process for polymerizing ethylene whereby it is possible to carry out the polymerization at atmospheric or at only slightly elevated pressures and at relatively low temperatures and obtain a polyethylene having very desirable and unusual properties, and to the catalyst used for the polymerization.

In Belgian Patents Nos. 533,362, 534,792 and 534,888 of K. Ziegler et al., there is described a new process of polymerizing ethylene to a high molecular weight polyethylene under relatively mild conditions of temperature and pressure by using as the catalyst for the polymerization a mixture of a compound of a metal of groups IV–B, V–B, VI–B or VIII of the periodic table of manganese in combination with an organometallic compound of an alkali metal, alkaline earth metal, zinc, earth metal (especially aluminum), or rare earth metal. The process is usually carried out by mixing the two catalyst components in a hydrocarbon diluent and then passing the ethylene into the catalyst mixture at atmospheric or slightly elevated pressure and at room temperature or moderately elevated temperatures.

Now, in accordance with this invention, it has been found that an entirely different type of zirconium compound, namely, a bis(cyclopentadienyl)zirconium salt such as bis(cyclopentadienyl)zirconium dichloride, may be used to produce a catalyst which gives excellent results in the polymerization of ethylene. These bis(cyclopentadienyl)zirconium salts are true organometallic compounds having a carbon to metal bond and it was most surprising to find that they could be used in combination with a metal alkyl compound of a metal of group I–A, II–A or III–A of the periodic table to produce a new catalyst for the polymerization of ethylene. As will be apparent from the following discussion, the use of a bis(cyclopentadienyl)zirconium salt in combination with a metal alkyl compound of an alkali metal, an alkaline earth metal, or aluminum is an effective catalyst for the polymerization of ethylene to yield a high molecular weight polymer.

The polymerization of ethylene in accordance with this invention is carried out by mixing the bis(cyclopentadienyl)zirconium salt with one of the metal alkyl reducing compounds, usually in an inert organic diluent, and contacting ethylene with the reaction mixture. Any bis(cyclopentadienyl)zirconium salt may be used as the zirconium component of the catalyst mixture. Thus, the anion may be that of an inorganic acid, an organic acid, and alkoxide group, etc. Exemplary of such anions are sulfate, fluoride, chloride, bromide, iodide, nitrate, phosphate, acetate, propionate, methoxide, ethoxide, butoxide, isobutoxide, etc. Of particular value are the bis(cyclopentadienyl)zirconium halides. The cyclopentadienyl moiety may be an alkyl-substituted cyclopentadienyl radical containing from 1 to 2 alkyl substituents. The alkyl groups may be alike or different and preferably will be alkyl groups containing from 1 to 8 carbon atoms. Thus, the cyclopentadienyl moiety of such bis(cyclopentadienyl)-zirconium salts may be an alkyl-substituted cyclopentadienyl radical such as methylcyclopentadienyl, dimethylcyclopentadienyl, ethylcyclopentadienyl, propylcyclopentadienyl, methylethylcyclopentadienyl, etc. These compounds are readily prepared by reacting a zirconium compound of the desired anion with cyclopentadienylsodium or alkyl derivatives thereof.

The metal alkyl reducing compound that is reacted with the zirconium compound may be any alkyl compound of a metal of group I–A, II–A or III–A of the periodic table, i.e., any alkali metal, alkaline earth metal, or aluminum. Exemplary of these metal alkyl compounds are the alkali metal alkyls such as n-butyllithium, n-amylsodium, etc., alkaline earth metal alkyls such as dimethylmagnesium, diethylmagnesium, butylmagnesium chloride, butylmagnesium bromide, and aluminum alkyls such as triethylaluminum, triisobutylaluminum, diisobutylaluminum hydride, diethylaluminum chloride, etc.

The reaction between the zirconium compound and the metal alkyl compound is readily carried out by mixing the two compounds in any inert diluent, as for example, aliphatic hydrocarbons such as hexane, heptane, isooctane, etc., cycloaliphatic hydrocarbons such as cyclohexane, etc., or aromatic hydrocarbons such as benzene, toluene, xylene, etc., halogenated aromatic hydrocarbons such as chlorobenzenes, chloronaphthalenes, etc., or any mixtures of such inert diluents. In carrying out the reaction between the two compounds, any concentration of the two reagents may be used that is convenient and the reaction may be carried out at any temperature, the latter generally being determined by the solvent being used, the activity of the reducing agent, etc. Usually the reaction is conveniently carried out at room temperature or at slightly elevated temperatures, but a temperature of from about −50° C. to about 150° C. could be used. The molar ratio of the metal alkyl compound to the zirconium compound may be varied over a wide range and will depend largely upon the metal alkyl compounds used. In general, the molar ratio of the metal alkyl compound to the zirconium compound will be from about 0.1:1 to 100:1, and more usually will be from about 1:1 to 10:1. The catalyst so obtained may be used immediately or it may be conveniently stored and used as desired, but freshly prepared catalysts are frequently or generally preferable. An alternate method of carrying out the reaction between the zirconium compound and the metal alkyl reducing compound for the polymerization process is to add the olefin to a solution or mixture of the bis(cyclopentadienyl)zirconium compound and then add the metal alkyl reducing compound as needed for the polymerization.

The polymerization process may be carried out in a wide variety of ways, as for example, either as a batch or continuous operation. As already pointed out, the catalyst combination may be preformed but preferably is formed in situ. In some instances it is desirable to prepare the catalyst mixture as described above and then use it in connection with an additional organometallic reducing compound. The latter may be the same organometallic reducing compound as used in preparing the catalyst solution or it may be a different one. By the proper selection of metal alkyl used with the bis(cyclopentadienyl)zirconium compound and of the diluent for the polymerization, it is possible to produce a catalyst completely soluble in the system, which catalyst is consequently much more readily separated from the polymer at the end of the reaction. Exemplary of such a system is the combination of triethylaluminum with bis(cyclopentadienyl)zirconium dichloride and toluene as the diluent.

Another variation that is frequently desirable, depending upon the type of polymer desired, is to add a viscosity reducing agent to the polymerization, as for example, hydrogen, whereby it is possible to produce lower molecular weight polymers than would otherwise normally be obtained. Obviously many other variations in the process may be made.

The selection of the temperature and pressure used for the polymerization process will depend upon many factors such as the degree of polymerization desired, etc. In general, the polymerization will be carried out at room temperature or slightly above, but any temperature within the range of from about −50° C. to about 150° C. and preferably from about −10° C. to about 100° C. may be used. In the same way, while atmospheric pressure or a pressure of only a few pounds may be used, the polymerization may be carried out over a wide range of pressures, as for example, from a partial vacuum to about 1000 lb. and preferably from about atmospheric to about 500 lb. pressure. Higher pressures may, of course, be used, but generally do not appreciably alter the course of the polymerization.

The following examples will illustrate the process of polymerizing ethylene in accordance with this invention and some of the many variations that can be made in this process. The molecular weight of the polymers produced in these examples is shown by the reduced specific viscosity (RSV) given for each. By the term "reduced specific viscosity" is meant the $\eta sp/C$ determined on an 0.1% solution of the polymer in decalin, containing 0.1 g. of the polymer per 100 ml. of solution, at 135° C. All parts and percentages are by weight unless otherwise indicated.

PREPARATION OF BIS(CYCLOPENTADIENYL) ZIRCONIUM DICHLORIDE

Cyclopentadienylsodium was prepared by adding 46 parts of cyclopentadiene dropwise to 27.6 parts of a sodium dispersion (50% in isooctane) in 350 parts of tetrahydrofuran. The reaction was exothermic and cooling was necessary to keep the temperature at about 25° C. The addition took 1 hour and, after an additional 2 hours of agitation, zirconium tetrachloride was added slowly to the clear red solution. Cooling was again necessary to keep the reaction at room temperature. A slow stream of nitrogen was passed in during the entire reaction. After standing at room temperature for 16 hours, the solvent was removed. The residue was extracted repeatedly with hot chloroform saturated with hydrogen chloride. The chloroform was removed and the residue was extracted with toluene. The cooled extract was centrifuged and the white needles of bis(cyclopentadienyl)zirconium dichloride were obtained. These were then recrystallized from toluene and on analysis were found to contain chlorine and zirconium in the theoretical amount.

Examples 1–7

In each of these examples 0.146 part of bis(cyclopentadienyl)zirconium dichloride was used in combination with a metal alkyl compound as the catalyst for the polymerization of ethylene. In Examples 1–3 the catalyst was preformed by mixing the two catalyst components in 35 parts of n-heptane, the reaction being carried out in a nitrogen atmosphere and the catalyst mixture being allowed to age by standing overnight at room temperature. In these examples each of the polymerization vessels was charged with the catalyst diluent mixture and after evacuating and equilibrating at 30° C., 2 parts of ethylene was added. In Examples 4–7 the catalyst was formed in situ by adding the metal alkyl to a mixture of the bis(cyclopentadienyl)zirconium dichloride and 2 parts of ethylene in the diluent (35 parts of n-heptane in Examples 4–6 and 40 parts of toluene in Example 7), which mixture had previously been equilibrated at 30° C. In Example 7 a clear yellow solution was formed when the triethylaluminum was added. The polymerization reaction in each example was stopped after a specified time by adding 4 parts of ethanol. The polymer was then separated by filtration, refluxed for 15 minutes with a 10% solution of hydrogen chloride, washed with methanol and then dried in a vacuum oven at 80° C. for 4 hours. The metal alkyl and the amount thereof used in each example are set forth in the following table along with the reaction time and RSV of the polyethylene obtained in each case.

| Ex. | Metal Alkyl | Parts | Catalyst Formed | Reaction Time, Hrs. at 30° C. | RSV |
|---|---|---|---|---|---|
| 1 | n-Amylsodium | 0.14 | Preformed | 21 | >60 |
| 2 | n-Butyllithium | 0.096 | do | 21 | >60 |
| 3 | Diethyl-magnesium | 0.12 | do | 21 | 21.8 |
| 4 | n-Amylsodium | 0.14 | in situ | 21 | >60 |
| 5 | n-Butyllithium | 0.096 | do | 21 | >60 |
| 6 | Diethyl-magnesium | 0.12 | do | 21 | 27.4 |
| 7 | Triethyl-aluminum | 0.11 | do | 19 | 1.9 |

What I claim and desire to protect by Letters Patent is:

1. The process of polymerizing ethylene which comprises contacting ethylene with a catalyst formed by mixing a bis(cyclopentadienyl)zirconium salt, wherein the cyclopentadienyl moiety is selected from the group consisting of cyclopentadienyl and alkylcyclopentadienyl radicals, with an alkyl metallic compound of a metal selected from the group consisting of the metals of groups I–A, II–A and III–A of the periodic table.

2. The process of claim 1 wherein the cyclopentadienyl moiety is the cyclopentadienyl radical.

3. The process of claim 2 wherein the bis(cyclopentadienyl)zirconium salt is a halide.

4. The process of polymerizing ethylene which comprises contacting ethylene with a catalyst formed by mixing bis(cyclopentadienyl)zirconium dichloride with an alkali metal alkyl.

5. The process of polymerizing ethylene which comprises contacting ethylene with a catalyst formed by mixing bis(cyclopentadienyl)zirconium dichloride with an alkaline earth metal alkyl.

6. The process of polymerizing ethylene which comprises contacting ethylene with a catalyst formed by mixing bis(cyclopentadienyl)zirconium dichloride with an alkylaluminum compound.

7. The process of claim 4 wherein the alkali metal alkyl is an alkylsodium.

8. The process of claim 4 wherein the alkali metal alkyl is an alkyllithium.

9. The process of claim 5 wherein the alkaline earth metal alkyl is a dialkylmagnesium.

10. The process of claim 6 wherein the alkylaluminum compound is a trialkylaluminum.

11. A polymerization catalyst comprising the product formed by reacting a bis(cyclopentadienyl)zirconium salt, wherein the cyclopentadienyl moiety is selected from the group consisting of cyclopentadienyl and alkylcyclopentadienyl radicals, with an alkyl metallic compound of a metal selected from the group consisting of the metals of groups I–A, II–A and III–A of the periodic table.

12. A polymerization catalyst comprising the product formed by reacting a bis(cyclopentadienyl)zirconium salt with an alkali metal alkyl.

13. A polymerization catalyst comprising the product formed by reacting a bis(cyclopentadienyl)zirconium salt with an alkaline earth metal alkyl.

14. A polymerization catalyst comprising the product formed by reacting a bis(cyclopentadienyl)zirconium salt with a trialkylaluminum.

References Cited in the file of this patent

UNITED STATES PATENTS 2,827,446   Breslow _____ Mar. 18, 1958

FOREIGN PATENTS 533,362   Belgium _____ May 16, 1955

OTHER REFERENCES

Wilkinson et al.: Journal of American Chem. Soc., vol. 76 (September 1954) pages 4281–84.